United States Patent
Park

(10) Patent No.: US 7,428,230 B2
(45) Date of Patent: Sep. 23, 2008

(54) TIME-DIVISION-DUPLEXING TYPE POWER AMPLIFICATION MODULE

(75) Inventor: Ja Young Park, Kyungki-do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 1110 days.

(21) Appl. No.: 10/669,328

(22) Filed: Sep. 25, 2003

(65) Prior Publication Data

US 2004/0248529 A1 Dec. 9, 2004

(30) Foreign Application Priority Data

Jun. 3, 2003 (KR) ...................... 10-2003-0035706

(51) Int. Cl.
*H04J 3/00* (2006.01)
*H01Q 11/12* (2006.01)
*H04B 7/00* (2006.01)
*H04K 1/02* (2006.01)

(52) U.S. Cl. .................... 370/345; 455/127.1; 455/522; 375/297

(58) Field of Classification Search ................. 370/280, 370/345; 455/127.1, 522; 375/297
See application file for complete search history.

(56) References Cited

U.S. PATENT DOCUMENTS

| 5,548,826 | A | 8/1996 | Sayers | |
|---|---|---|---|---|
| 6,496,063 | B2 * | 12/2002 | Hinrichsen et al. | 330/129 |
| 6,919,762 | B2 * | 7/2005 | Akamine et al. | 330/133 |
| 6,993,358 | B2 * | 1/2006 | Shiotsu et al. | 455/552.1 |
| 7,251,292 | B2 * | 7/2007 | Kandiar | 375/297 |
| 2002/0146981 | A1 | 10/2002 | Saint-Hilaire et al. | |
| 2002/0183024 | A1 * | 12/2002 | Yamaguchi | 455/127 |
| 2003/0092465 | A1 * | 5/2003 | Darabi et al. | 455/552 |
| 2003/0190895 | A1 * | 10/2003 | Mostov et al. | 455/78 |

FOREIGN PATENT DOCUMENTS

| DE | 102 14 985 | 1/2003 |
|---|---|---|
| JP | 10-75195 | 3/1998 |
| JP | 10-276003 | 10/1998 |
| JP | 2002-16450 | 1/2002 |
| JP | 2002-232320 | 8/2002 |
| JP | 2002-261650 | 9/2002 |
| WO | 00/42744 | 7/2000 |

* cited by examiner

*Primary Examiner*—Firmin Backer
*Assistant Examiner*—Nittaya Juntima
(74) *Attorney, Agent, or Firm*—Lowe Hauptman Ham & Berner

(57) ABSTRACT

A time division duplex (TDD) type power amplification module, through which a transmitting signal is amplified and a receiving signal is not amplified without amplifying the receiving signal, reduces a power consumption and realizes a class I bluetooth function by being combined with a class II bluetooth module.

17 Claims, 7 Drawing Sheets

TIME-DIVISION-DUPLEXING TYPE POWER AMPLIFICATION MODULE

CROSS-REFERENCE TO RELATED APPLICATION

This application claims to benefit of Korean Patent Application No. 2003-35706, filed on Jun. 3, 2003, in the Korean Intellectual Property Office, the disclosure of which is incorporated herein by reference.

BACKGROUND OF THE INVENTION

1. Field of the Invention

The present invention relates to a wireless transmitting and receiving apparatus performing a bluetooth method, and more particularly, to a time division duplex (TDD) type power amplification module functioning as an amplification line in a transmission mode and as a transmission line in a receiving mode.

2. Description of the Related Art

A bluetooth method is an industrial standard of the computer and telecommunication industries for transmitting and receiving data in a high speed using a wireless frequency without using a physical communication cable between electronic apparatuses. The bluetooth method is used for a short-distance wireless connection among mobile phones, computers, and PDAs. Using the bluetooth method, the data having a predetermined frequency width is transmitted between the apparatuses spaced-apart from each other by tens meters in a speed of 764 kbps using a transmission power of 1 mW by frequency-hopping among 79 independent 1 MHz channels having a center frequency of 2.402 to 2.478 GHz. The bluetooth method is to comply with a time division duplex (TDD) method of alternatively transmitting and receiving the data.

In addition, an apparatus performing the bluetooth method provides maximum 3 channels of audio channels as well as a data channel, and enables a point-to-point or multi-points connection.

Using this technology, it is possible that a cellular phone, wireless pager, or PDA user can buy a single phone having three functions of a cellular phone, a wireless pager, and a PDA. The single phone functions as a home and office mobile phone to be able to be synchronized with information stored in desk-top or notebook computers, transmits and receives a facsimile letter, and prints the data.

Generally, the single phone incorporates mobile and non-mobile computer apparatuses. Each apparatus needs to be mounted with a bluetooth transceiver chip (IC) to perform the bluetooth method.

According to definitions of the industrial standard of the bluetooth method, the bluetooth apparatus is classified into class I, class II, and class III based on a transmission output power.

The apparatus having the class II generally has the transmission output power of 0 dBm (a transmitting and receiving distance of about 10 m). As shown in FIG. 1, the apparatus having the class II includes a bluetooth module 10 performing the class II. The class II bluetooth module 10 includes a bluetooth transceiver IC 11 modulating or demodulating transmitting or receiving data (signal) using the TDD method according to the bluetooth method, first and second matching networks 12, 13 coupled to a transmitting signal terminal TX and a receiving signal terminal RX of the bluetooth transceiver IC 11, respectively, to perform an impedance matching, a TDD transmitting and receiving switch 14 alternatively selecting one of the first and second matching networks 12, 13 according to a TDD transmitting-on (TDD-TXON) control signal outputted from the bluetooth transceiver IC 11, and a frontend filter 15 coupled between the TDD transmitting and receiving switch 14 and an antenna ANT to filter the transmitting and receiving data.

The class II bluetooth module 10 has a transmission distance of 10 m by transmitting the transmitting signal without amplifying the transmitting signal to be transmitted.

To the contrary, a class I bluetooth module 20 as shown in FIG. 2 has the transmission distance of 100 m using the transmission output power of 20 dBm of the transmitting signal.

Referring to FIG. 2, the class I bluetooth module 20 includes a bluetooth transceiver IC 21 modulating and demodulating the transmitting signal and the receiving signal according to the bluetooth method, first and second matching networks 22, 23 coupled to a transmitting signal terminal TX and a receiving signal terminal RX of the bluetooth transceiver IC 21 to perform impedance-matching, a power amplifier 24 coupled to the first matching network 22 to amplify the transmitting signal according to a control signal of the bluetooth transceiver IC 21 in a transmitting mode, a third matching network 25 coupled to an output terminal of the power amplifier 24 to perform the impedance-matching, a transmitting and receiving switch 26 alternatively selecting one of the second matching network 23 and the third matching network 25 according to a TDD transmitting-mode-on signal outputted from the bluetooth transceiver 21, a frontend filter 27 coupled between the transmitting and receiving switch 26 and an antenna ANT to filter the transmitting signal and the receiving signal.

The class I bluetooth module and the class II bluetooth module are alternatively selected according to the transmission distance of the bluetooth apparatus.

Generally, since a manufacturer of the bluetooth module develops and supplies the class I bluetooth module and the class II bluetooth module separately, the manufacturer of the class II bluetooth module needs an additional development period and manpower to develop the class I bluetooth module. Accordingly, a manufacturing cost of the class I bluetooth module is increased, it costs a lot for a user to use the class I bluetooth module which is less demanded than the class II bluetooth module. With this reason, the supply of the class I bluetooth module is less than the class II bluetooth module.

Recently, a class II bluetooth module 30 includes a highly integrated bluetooth transceiver, such as a bluetooth transceiver 31 integrated with matching networks 311, 312 and a TDD transmitting and receiving switch 313, as shown in FIG. 3. The class II bluetooth module 30 may further include a balun transformer 32 converting a balanced signal to an unbalanced signal as well as a frontend filter 33. The highly integrated bluetooth transceiver may be integrated with the balun transformer 32 and the frontend filter 33 which have not been integrated with the highly integrated bluetooth transceiver.

However, if the highly integrated bluetooth transceiver is integrated with the TDD transmitting and receiving switch 313 to be used in the class II bluetooth module as shown in FIG. 3, it is very difficult to connect the power amplifier, which is not integrated in the highly integrated bluetooth transceiver, to the highly integrated bluetooth transceiver due to heat and electro-magnetic wave generations occurring during manufacturing the class II bluetooth module.

SUMMARY OF THE INVENTION

In order to solve the above and/or other problems, it is an aspect of the present invention to provide a time division duplex (TDD) type power amplification module performing an amplifying operation in a transmitting mode and a transmitting line operation in a receiving mode according to a TDD method so as to realize a class I bluetooth function by being combined with a class II bluetooth function.

It is another aspect of the present invention to provide a time division duplex (TDD) type power module combined with an integrated bluetooth transceiver, which is integrated with a TDD transmitting and receiving switch, to realize a class I bluetooth function.

Additional aspects and advantages of the invention will be set forth in part in the description which follows and, in part, will be obvious from the description, or may be learned by practice of the invention.

To achieve the above and/or other aspects, a time division duplex (TDD) type power amplification module, through which a transmitting signal is amplified and a receiving signal is not amplified without passing through a power amplifier, reduces a power consumption and realizes a class I bluetooth function by being combined with a class II bluetooth module. The TDD type power amplification module includes a terminal through which a TDD control signal is transmitted, a first port through which a transmitting signal is inputted and a receiving signal is outputted, a second port through which the transmitting signal is outputted and the receiving signal is inputted, first and second transmission lines coupled between the first and second ports to have a quarter of a wavelength of the transmitting and receiving signals and to form a receiving signal path of the receiving signal, a power amplifier unit amplifying the transmitting signal inputted through the first port to output the amplified transmitting signal to the second port, first and second switching units provided between the first and second ports and the power amplifier unit, and forming and blocking a transmitting and receiving signal path between the first port and the second port through the power amplifier unit, a third switching unit provided between a junction of the first and second transmission lines and ground to be alternatively turned on and off according to a TDD control signal so as to maintain or block a transmission of the receiving signal, and third and fourth transmission lines coupled between the terminal and the first and second switching units to transmit the TDD control signal to the first and second switching units as a bias signal, and having a quarter of a wavelength of the transmitting and receiving signals.

According to another aspect of the present invention, the power amplifier unit includes a power amplifier coupled between the first and second switching units to amplify the transmitting signal by a predetermined gain, and first and second matching networks coupled between input and output terminals of the power amplifier and the first and second switching units to perform impedance matching.

According to another aspect of the present invention, the power amplifier unit includes one of a filter and a circuit removing a high frequency component of the transmitting signal outputted from the power amplifier unit.

According to another aspect of the present invention, each of the first, second, and third switching units comprises a pin diode.

According to another aspect of the present invention, the power amplifier unit is in one of an on-state and an off-state according to the TDD control signal.

According to another aspect of the present invention, the second matching network includes one of a filter and a circuit removing a high frequency component of the transmitting signal outputted from the power amplifier unit.

According to another aspect of the present invention, a class I bluetooth module includes an antenna, a class II bluetooth module, and a TDD type power amplification module. The class II bluetooth module includes a bluetooth transceiver IC modulating and demodulating transmitting and receiving data using a TDD method of a bluetooth standard, and generating a TDD transmitting and receiving mode control signal, and a TDD transmitting and receiving switch alternatively connects the antenna to one of a transmitting terminal and a receiving terminal according to the TDD transmitting and receiving mode control signal of the bluetooth transceiver IC. The TDD type power amplification module is provided between the class II bluetooth module and the antenna to be operative according to the TDD transmitting and receiving mode control signal of the bluetooth transceiver IC, amplifies the transmitting data to transmit the amplified transmitting data, and transmits the receiving data from the antenna to the class II bluetooth module.

According to another aspect of the present invention, a bluetooth module includes a bluetooth transceiver having a first terminal, through which a transmitting signal and a receiving signal are transmitted, and generating a TDD transmitting and receiving mode control signal, and a TDD power amplification module formed of an integrated circuit. the TDD power amplification module includes a second terminal receiving the TDD transmitting and receiving mode control signal and having a first port connected to the terminal of the bluetooth transceiver and a second port, amplifies the transmitting signal received from the bluetooth transceiver through the first port to output the amplified transmitting signal through the second port according to the TDD transmitting and receiving mode control signal, and transmits the receiving signal received through the second port without amplifying the receiving signal.

BRIEF DESCRIPTION OF THE DRAWINGS

These and/or other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
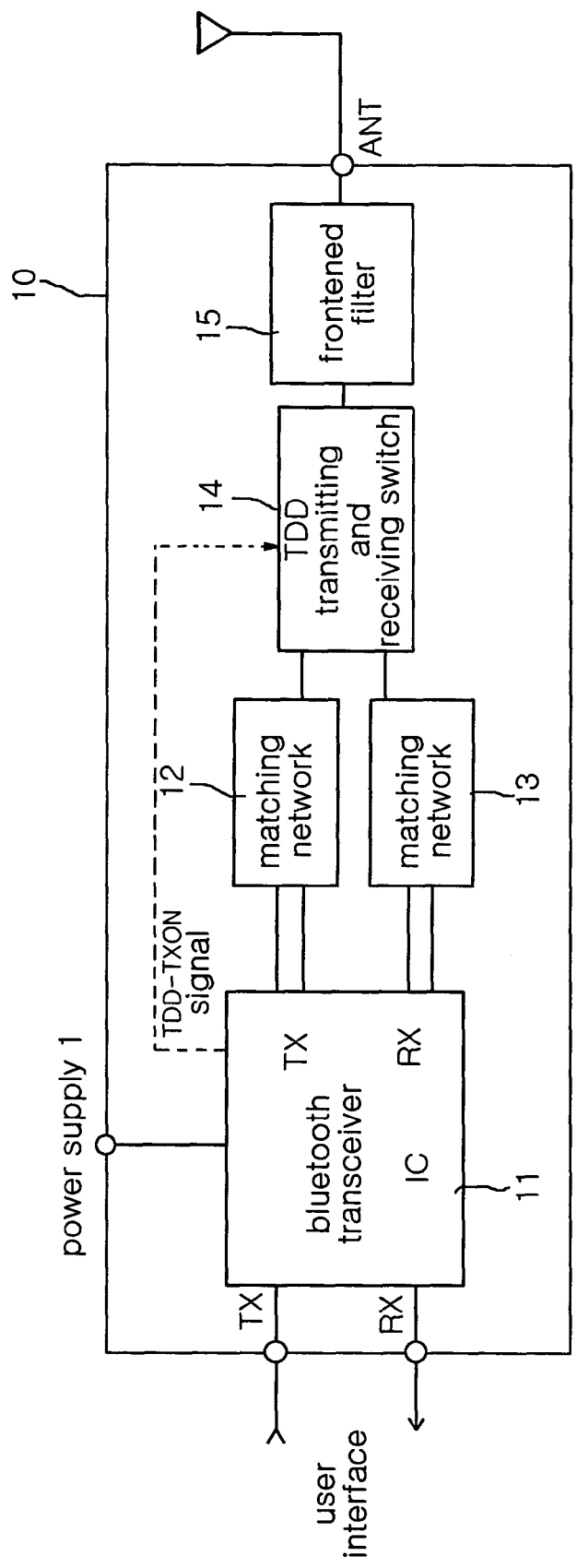
FIG. 1 is a block diagram of a conventional wireless transmitting and receiving apparatus performing a class II bluetooth method.
Figure 2:
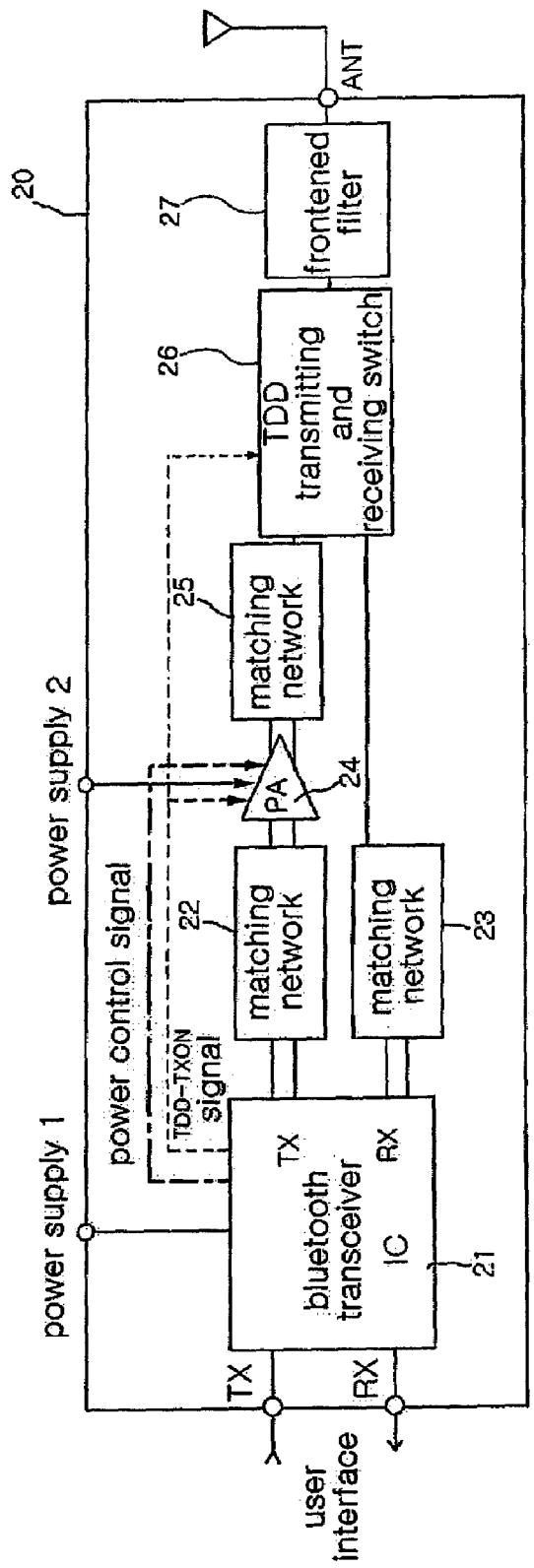
FIG. 2 is a block diagram of another conventional wireless transmitting and receiving apparatus performing a class I bluetooth method.
Figure 3:
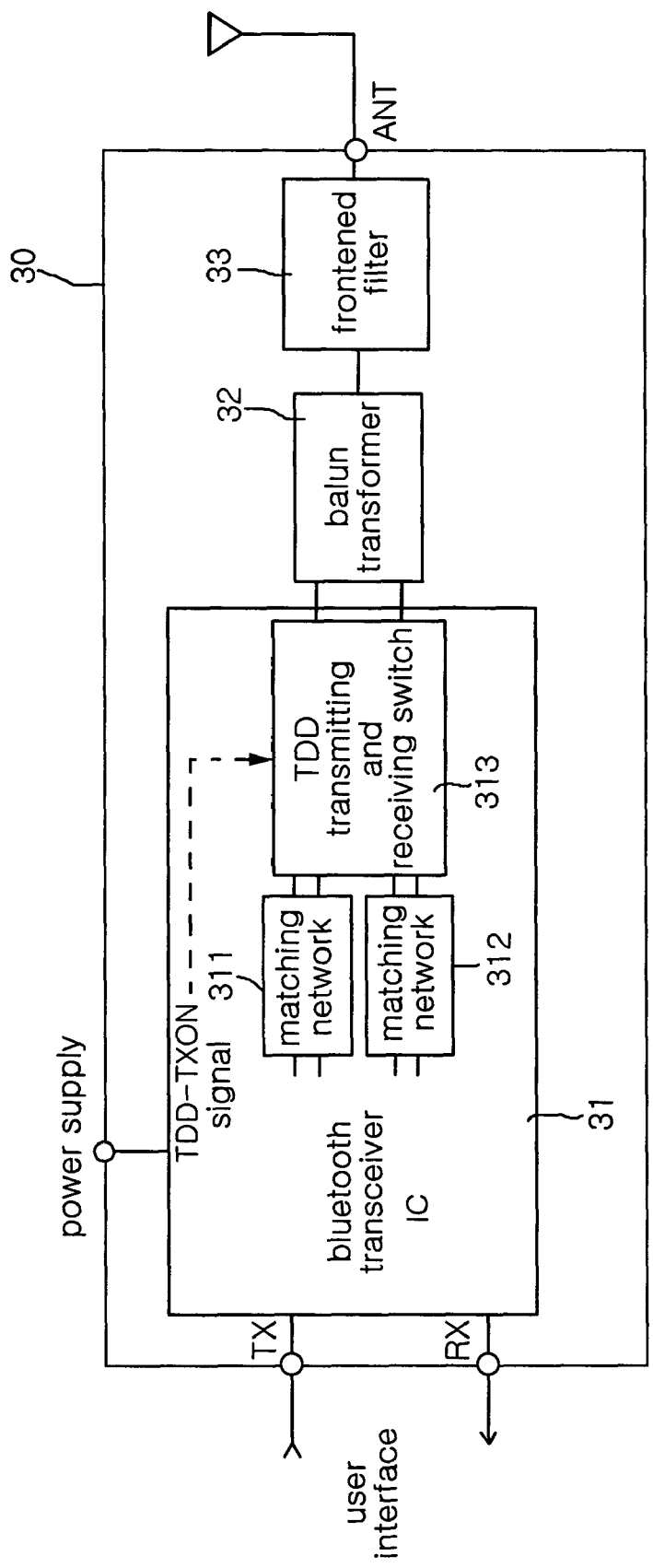
FIG. 3 is a block diagram of an integrated chip of the conventional wireless transmitting and receiving apparatus performing the class II bluetooth method.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Figure 4:
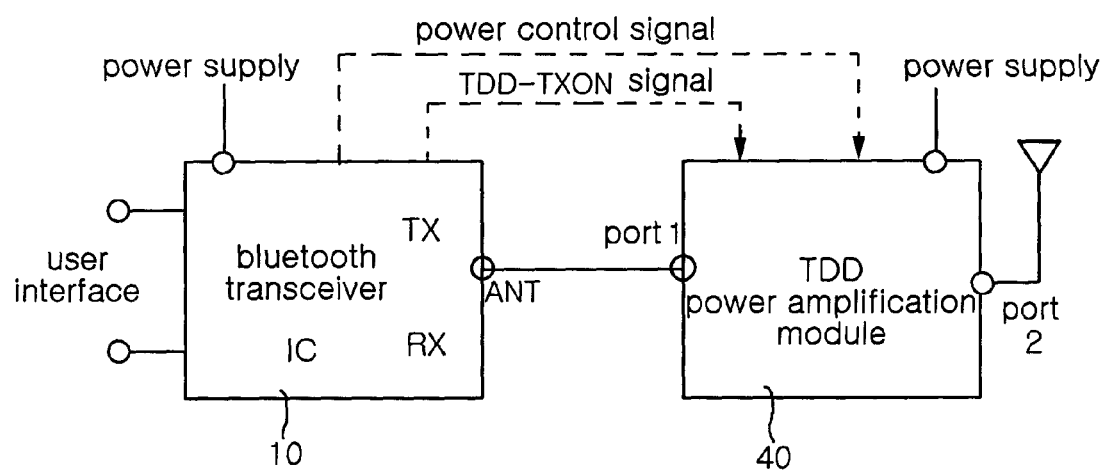
FIG. 4 is a block diagram of a wireless transmitting and receiving apparatus having a time division duplex (TDD) type power amplification module to perform a class I bluetooth method according to an embodiment of the present invention.
Figure 5:
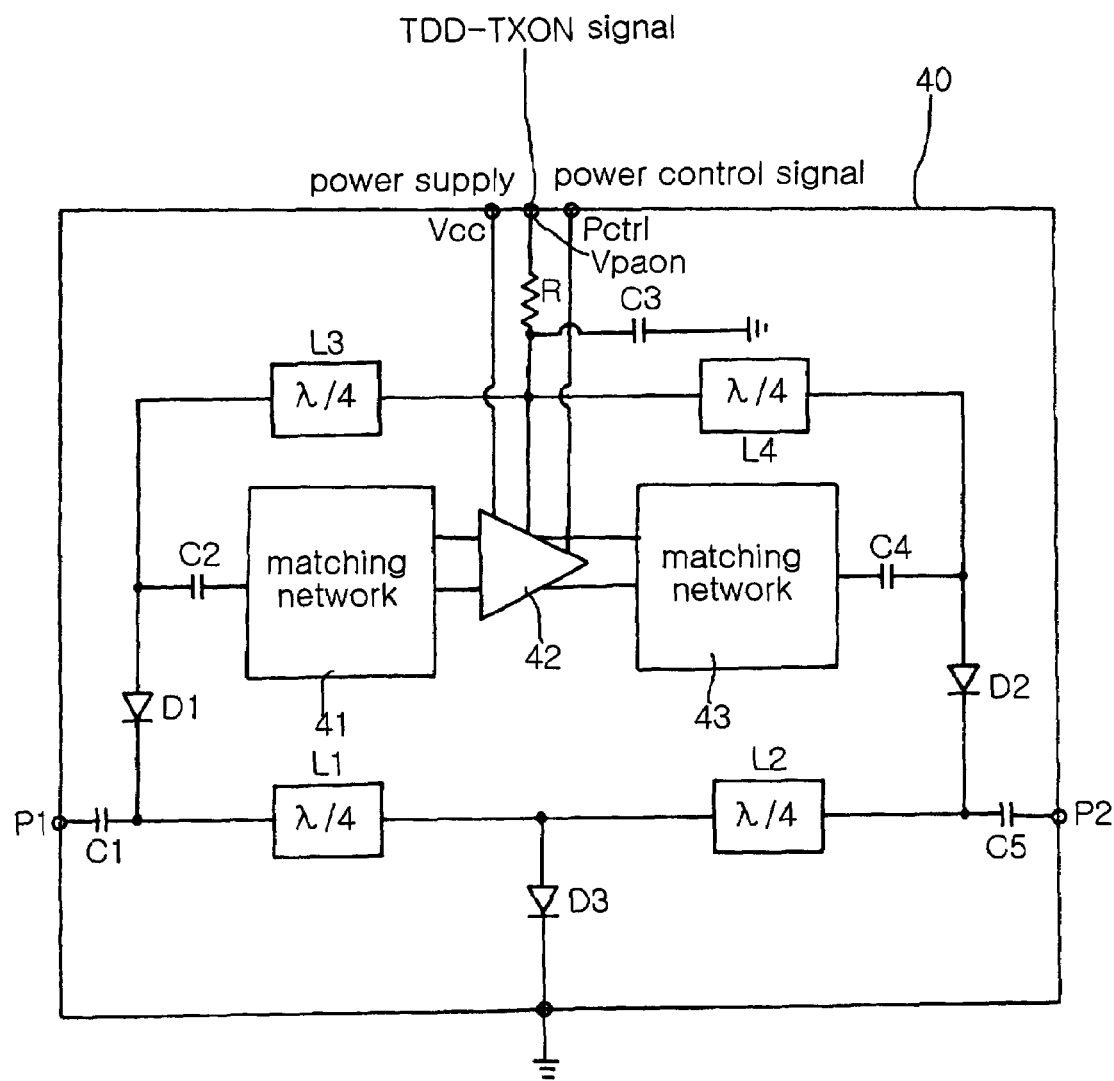
FIG. 5 is a block diagram showing a detailed structure of the TDD type power amplification module shown in FIG. 4.

FIG. 4 is a block diagram of a wireless transmitting and receiving apparatus having a time division duplex (TDD) type power amplification module to perform a class I bluetooth method according to an embodiment of the present invention, and FIG. 5 is a block diagram showing a detailed structure of the TDD type power amplification module shown in FIG. 4.

As shown in FIG. 4, the wireless transmitting and receiving apparatus includes a bluetooth transceiver 10 coupled to a user interface and a power source, and a TDD type power amplification module 40 having a first port P1 (Port 1) coupled to an output ANT (a transmitting signal terminal and a receiving signal terminal) of the bluetooth transceiver 10 and the power source, receiving a power control signal and a TDD transmission-on (TDD-TXON) control signal from the bluetooth transceiver 10, and coupled to an antenna through a second port P2 (Port 2).

Referring to FIGS. 4 and 5, the TDD type power amplification module 40 includes the first and second port P1, P2 through which an input signal and an output signal (a transmitting signal and a receiving signal) pass, respectively, a first transmission line L1 having a first end coupled to the first port P1 through a capacitor C1 to have a quarter of a wavelength λ of the transmitting and receiving signals, a second transmission line L2 coupled between a second end of the first transmission line L1 and the second port P2 through another capacitor C5, a first pin diode D1 having a cathode coupled to the first port P1 through the capacitor C1, a second pin diode D2 having a cathode coupled to the second port P2 through the capacitor C5, a first matching network 41 coupled to an anode of the first pin diode D1 through another capacitor C2 to perform impedance-matching or alternatively perform a conversion between balanced and unbalanced signals, a power amplifier 42 amplifying the transmitting signal inputted through the first matching network 41 by a predetermined gain according to the TDD transmission-on (TDD-TXON) control signal, a second matching network 43 coupled between the power amplifier 42 and the second pin-diode D2 through another capacitor C4 to perform the impedance-matching or alternatively perform the conversion between the balanced and unbalanced signals, a third pin diode D3 having a cathode coupled to ground and an anode coupled to a junction of the first and second transmission line L1, L2, a third transmission line L3 coupled to the anode of the first pin diode D1 to have a quarter of the wavelength of the transmitting and receiving signals, a fourth transmission line L4 coupled to the anode of the second pin diode D2 to have a quarter of the wavelength λ of the transmitting and receiving signals, a bias resistor R coupled between a terminal, through which the TDD transmission-on (TDD-TXON) control signal is received from the bluetooth transceiver 10, and a junction of the third and fourth transmission lines L3, L4, and another capacitor C3 coupled between the ground and the junction of the third and fourth transmission lines L3, L4.

The second matching network 43 provided to receive an output of the power amplifier 42 may include a filter removing a high frequency component, which can be included in the transmitting and receiving signals, or a circuit having the same function as the filter.

The TTD type power amplification module 40 is described in FIG. 5 as an example of the present invention, and the first, second, and third pin diodes D1, D2, D3 are used as a switching unit. A pin diode is turned on when a positive direction voltage is supplied, and turned off when the positive direction voltage is not greater than a reference value. Accordingly, the pin diode functions as an on-off component of the switching unit.

The power amplifier 42 receives a potential Vcc from the power source to operate when the TDD-TXON control signal received as an enable signal Vpaon is a high signal, and terminate an operation when the TDD-TXON control signal received as an enable signal Vpaon is a low signal. The power amplifier 42 receives a power control signal Pctrl through a separate terminal from the terminals for the TDD-TXON control signal and potential Vcc, thereby controlling an amplification gain. A generally known power amplifier can be used as the power amplifier 42. According to the present invention, the power amplifier 42 is controlled to be synchronized with transmitting and receiving modes using the TDD method. An operation of the power amplification module 40 is explained according to the high or low signal of the TDD-TXON control signal The operation of the TDD type power amplification module 40 shown in FIG. 5 is described with reference to FIGS. 6A and 6B.

Figure 6A:
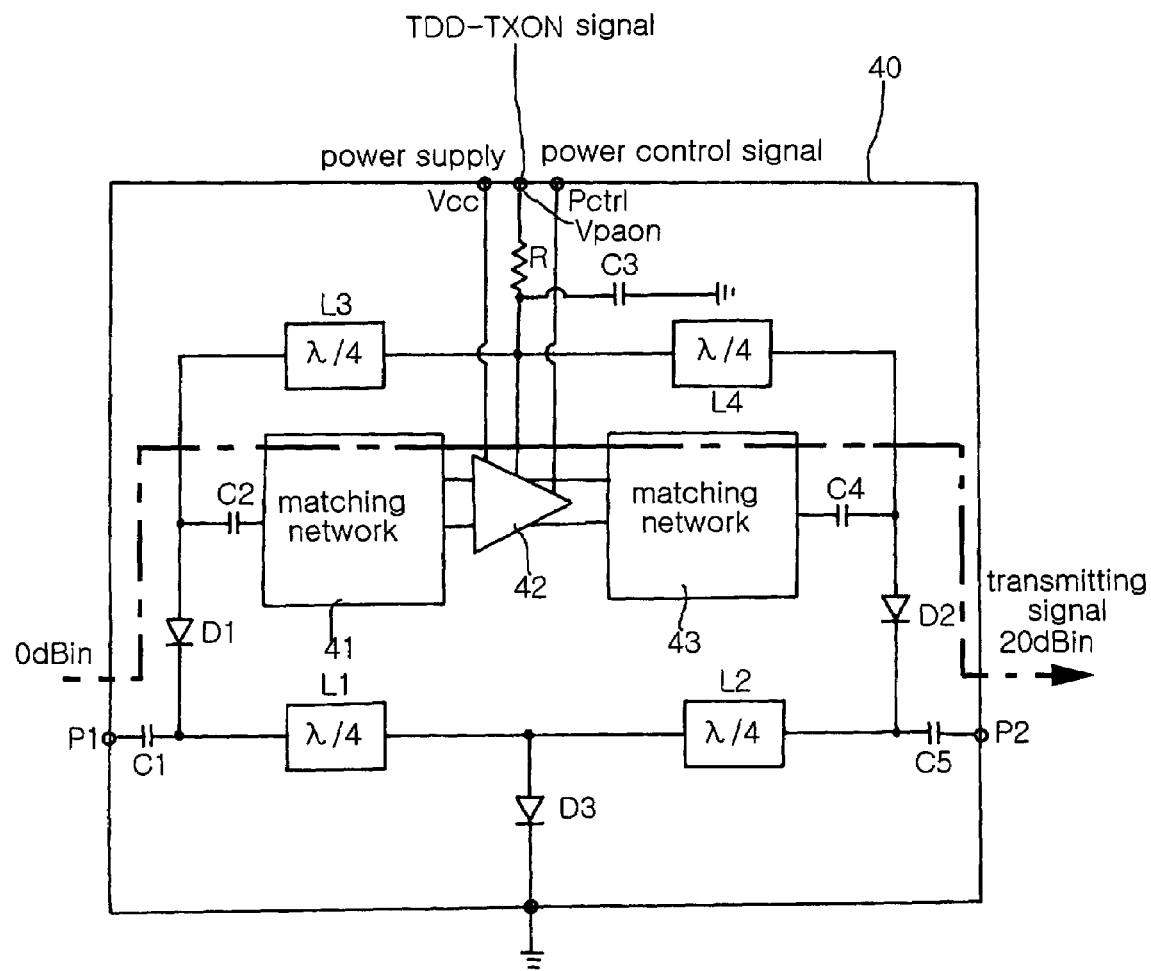
FIG. 6A is a view showing a transmitting mode of the TDD type power amplification module shown in FIG. 5.

FIG. 6A is a view showing a transmitting mode of the TDD type power amplification module 40 shown in FIG. 5 when the TDD-TXON control signal is the high signal. In a case of the high signal, the transmitting signal is transmitted to the first port P1, the first matching network 41, the power amplifier 42, the second matching network 43, and the second port P2 in order.

When the TDD-TXON control signal is the high signal, the TDD-TXON control signal is transmitted to the anodes of the first and second pin diodes D1, D2 through the third and fourth transmission line L3, L4 and the resistor R, and the pin diodes D1, D2 are turned on because a voltage of the anode is higher than a voltage of the cathode. Since the cathode is coupled to the ground, the third pin diode D3 having the anode coupled to the first and second pin diodes D1, D2, through the first and second transmission lines L1, L2 becomes turned on.

Accordingly, with respect to the transmitting and receiving signals having the wavelength λ and inputted through the first and second ports P1, P2, the first and second transmission lines L1, L2 having the quarter of the wavelength λ are coupled to the ground to be a short circuit, and impedances of the first and second transmission lines L1, L2 are increased. Since the first and second pin diodes D1, D2 are turned on, each resistance of the pin diodes D1, D2 becomes about zero.

Therefore, the receiving signal inputted through the second port P2 is blocked, and the transmitting signal is inputted to the first matching network 41 through the first pin diode D1 which has a relatively low resistance. The transmitting signal is transmitted to the power amplifier 42 through the impedance matching of the matching network 41, and the power amplifier 42 amplifies the transmitting signal according to the amplification gain determined by the power control signal Pctrl to output the amplified transmitting signal. The amplified transmitting signal is outputted to the second port P2 through the second matching network 43 and the second pin diodes D2 which is turned on.

As described above, a high frequency component is allowed to pass the capacitors C1, C2, C3, C4, C5, and a low frequency component is prevented from passing through the capacitors C1, C2, C3, C4, C5 so that a direct current component does not affect a signal path of the transmitting and receiving signals according to the TDD-TXON control signal. The high frequency component of the transmitting signal is by-passed by the capacitor C3 to increase the impedance of the third and fourth transmission lines L3, L4 at the junction of the third and fourth transmission lines L3, L4 and the capacitors C2, C3 so that the transmitting and receiving signals of the signal path is prevented from flowing through a direct current circuit of the TDD-TXON control signal.

According to the above operation, the transmitting signal inputted through the first port P1 is separated from the direct current to be outputted to the second port P2 through the power amplifier 42.

Figure 6B:
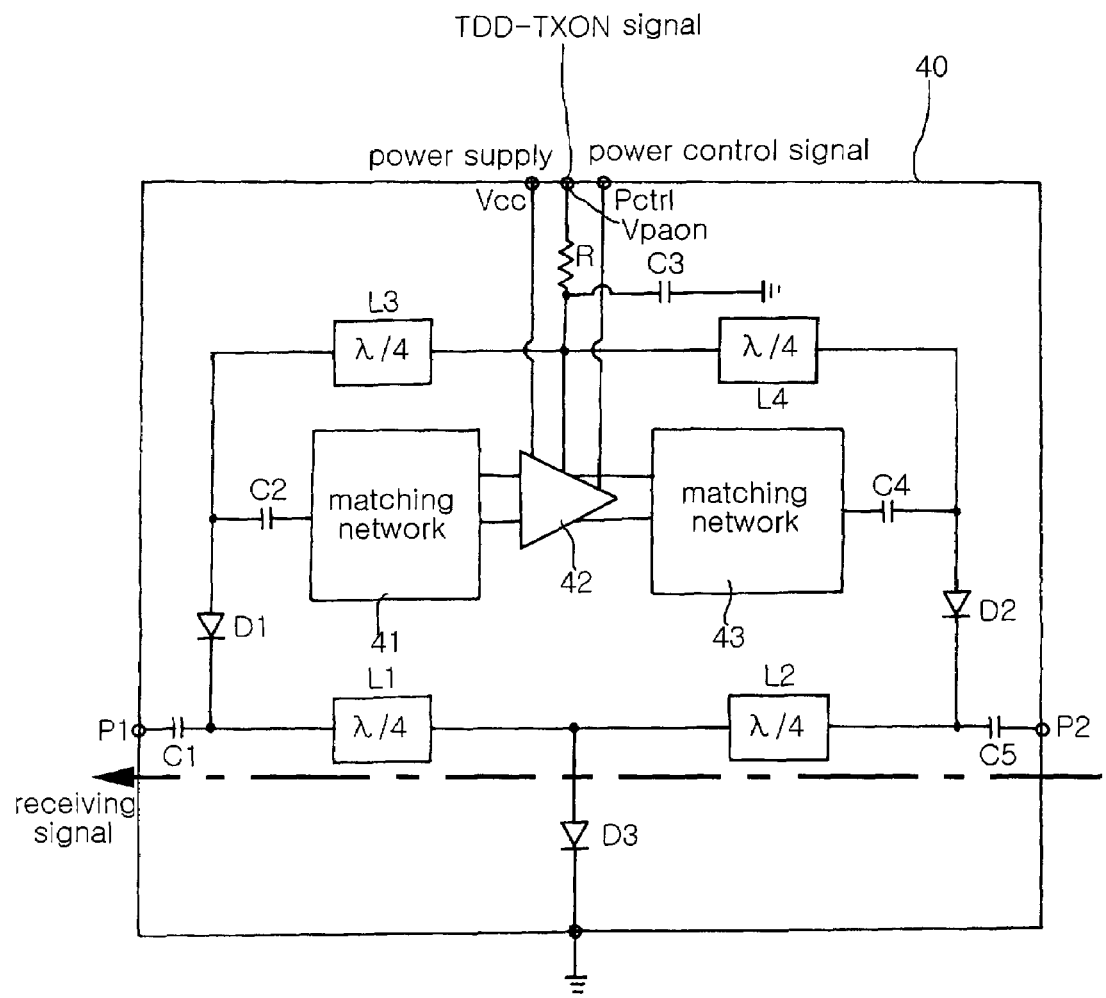
FIG. 6B is a view showing a receiving mode of the TDD type power amplification module shown in FIG. 5.

Next, if the TDD-TXON control signal is the low signal, the receiving signal inputted through the second port P2 is outputted to the first port P1 through the first and second transmission lines L1, L2. FIG. 6B is a view showing the receiving mode of the TDD type power amplification module shown in FIG. 5 when the TDD-TXON control signal is the low signal.

That is, if the TDD-TXON control signal is the low signal, voltages of the anodes of the pin diodes D1, D2 coupled to the terminal of the TDD-TXON control signal through the resistor R and the third and fourth transmission lines L3, L4 are lowered. Therefore, the first and second pin diodes D1, D2 are turned off, and the third pin diode D3 becomes turned off because a voltage of the anode of the third pin diode D3 is lowered. Resistance components of the first, second, and third pin diode D1, D2, D3 are increased.

Accordingly, a signal transmission from the first and second ports P1, P2 to the power amplifier 42 is blocked due to a turned-odd state of the first and second pin diodes D1, D2. The first and second transmission lines L1, L2 functions as an impedance-matched transmission line because the resistance components of the third pin diode D3 coupled to a junction of the first and second transmission lines L1, :L2.

Therefore, the receiving signal received through the second port P2 is outputted to the first port P1 through the first and second transmission lines L1, l2.

As described above, the TDD type power amplification module consumes a minimum power when amplifying the transmitting signal using the TDD method, to reduce an unnecessary power consumption. In addition, the TDD type power amplification module is simply combined with the class II bluetooth module so that an apparatus having the class I and II bluetooth functions can be manufactured without an additional manufacturing cost.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed is:

1. A TDD power amplification module, comprising:
   a terminal through which a TDD control signal is transmitted;
   a first port through which a transmitting signal is inputted and a receiving signal is outputted;
   a second port through which the transmitting signal is outputted and the receiving signal is inputted;
   first and second transmission lines coupled between the first and second ports to have a quarter of a wavelength of the transmitting and receiving signals and to form a receiving signal path of the receiving signal;
   a power amplifier unit amplifying the transmitting signal inputted through the first port to output the amplified transmitting signal to the second port;
   first and second switching units provided between the first and second ports and the power amplifier unit, and forming and blocking a transmitting signal path between the first port and the second port through the power amplifier unit;
   a third switching unit provided between a junction of the first and second transmission lines and ground to be alternatively turned on and off according to the TDD control signal so as to maintain or block a transmission of the receiving signal; and
   third and fourth transmission lines coupled between the terminal and the first and second switching units to transmit the TDD control signal to the first and second switching units as a bias signal, and having a quarter of the wavelength of the transmitting and receiving signals.

2. The TDD power amplification module of claim 1, wherein the power amplifier unit comprises:
   a power amplifier coupled between the first and second switching units to amplify the transmitting signal by a predetermined gain; and
   first and second matching networks coupled between input and output terminals of the power amplifier and the first and second switching units to perform impedance matching.

3. The TDD power amplification module of claim 1, wherein the power amplifier unit comprises:
   one of a filter and a circuit removing a high frequency component of the amplified transmitting signal outputted from the power amplifier unit.

4. The TDD power amplification module of claim 1, wherein each of the first, second, and third switching units comprises:
   a pin diode.

5. The TDD power amplification module of claim 1, wherein the power amplifier unit is in one of an on-state and an off-state according to the TDD control signal.

6. The TDD power amplification module of claim 2, wherein the second matching network comprises:
   one of a filter and a circuit removing a high frequency component of the amnplified transmitting signal outputted from the power amplifier unit.

7. A bluetooth module, comprising:
   a bluetooth transceiver having a first terminal through which a transmitting signal and a receiving signal are transmitted, and generating a TDD transmitting and receiving mode control signal; and
   a TDD power amplification module formed of an integrated circuit, having a second terminal receiving the TDD transmitting and receiving mode control signal, having a first port connected to the first terminal of the bluetooth transceiver, having a second port, amplifying the transmitting signal received from the bluetooth transceiver through the first port to output the amplified transmitting signal through the second port according to the TDD transmitting and receiving mode control signal, and transmitting the receiving signal received through the second port without amplifying the receiving signal;
   wherein the TDD power amplification module comprises:
   first and second transmission lines coupled between the first and second ports through first and second capacitors, respectively;
   a first switch coupled between the second terminal and a first junction between the first capacitor and the first transmission line;
   a second switch coupled between the second terminal and a second junction between the second capacitor and the second transmission line; and
   a third switch coupled between ground and a third junction between the first and second transmission lines.

8. The bluetooth module of claim 7, wherein the TDD power amplification module further comprises:
   a power amplifier amplifying the transmitting signal transmitted through the first switch to output the amplified transmitting signal to the second switch according to the TDD transmitting and receiving mode control signal.

9. The bluetooth module of claim 8, wherein the TDD power amplification module further comprises:
a third capacitor and a first matching network coupled between the power amplifier and the first switch.

10. The bluetooth module of claim 9, wherein the TDD power amplification module further comprises:
a fourth capacitor and a second matching network coupled between the power amplifier and the second switch.

11. The bluetooth module of claim 8, wherein the TDD power amplification module further comprises:
a third transmission line coupled between the second terminal and the first switch.

12. The bluetooth module of claim 11, wherein the TDD power amplification module further comprises:
a fourth transmission line coupled between the second terminal and the second switch.

13. The bluetooth module of claim 8, wherein the TDD power amplification module further comprises:
a first path formed by the first port, the first switch, the power amplifier, the second switch, and the second port so as to transmit the transmitting signal through the power amplifier.

14. The bluetooth module of claim 13, wherein the TDD power amplification module further comprises:
a second path formed by the second port, the second transmission line, the first transmission line, and the first port so as to transmit the receiving signal from the second port to the first port without passing through the power amplifier.

15. The bluetooth module of claim 8, wherein the first switch comprises:
a first pin diode having an anode coupled to the second terminal and a cathode coupled to the first junction between the first port and the first transmission line.

16. The bluetooth module of claim 15, wherein the second switch comprises:
a second pin diode having an anode coupled to the second terminal and a cathode coupled to the second junction between the second port and the second transmission line.

17. The bluetooth module of claim 8, wherein the third switch comprises:
a pin diode having an anode coupled to the third junction between the first and second transmission lines and a cathode coupled to the ground.

* * * * *